United States Patent
Cheng

(10) Patent No.: US 6,669,376 B2
(45) Date of Patent: Dec. 30, 2003

(54) DUPLEX CLIP FOR OPTICAL FIBER CONNECTOR

(75) Inventor: Yung Chang Cheng, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/037,712

(22) Filed: Dec. 29, 2001

(65) Prior Publication Data

US 2003/0091295 A1 May 15, 2003

(30) Foreign Application Priority Data

Nov. 15, 2001 (TW) .................................. 90219622 U

(51) Int. Cl.[7] .............................................. G02B 6/36
(52) U.S. Cl. ...................................................... 385/76
(58) Field of Search .............................. 385/76, 77, 78, 385/53, 55, 56

(56) References Cited

U.S. PATENT DOCUMENTS 5,343,547 A * 8/1994 Palecek et al. ............... 385/76
5,475,781 A * 12/1995 Chang et al. ................. 385/76

* cited by examiner

Primary Examiner—Khiem Nguyen
(74) Attorney, Agent, or Firm—Wei Te Chung

(57) ABSTRACT

A duplex clip (3) for converting a pair of simplex optical fiber connectors (40) into a unitary structure that operates as a duplex optical fiber connector includes a first complementary part (30) and a second complementary part (30'). The first complementary part and the second complementary part have an identical structure. The first complementary part further includes a base (31), a side wall (32) and a compartment wall (33), wherein the side wall is perpendicularly disposed at the edge of the base, and the compartment wall is mounted at the center of the base. Keys (35) on one complementary part clip into slots (34, 36) on the opposite complementary part, engaging the first and second complementary parts together and firmly fixing the simplex optical fiber connectors therebetween.

20 Claims, 5 Drawing Sheets

DUPLEX CLIP FOR OPTICAL FIBER CONNECTOR

BACKGROUND OF THE INVENTION

1. Field of the Invention

The present invention relates to a duplex clip, and particularly to a duplex clip for a pair of push-pull coupling type optical fiber connectors.

2. Description of the Related Art

U.S. Pat. No. 4,762,389 discloses simplex and duplex optical fiber connectors for connecting one and two optical fibers to other optical fibers and to optical components such as light emitting elements, or light receiving elements. The duplex connector has a pair of plugs, each fixed to an end of an optical fiber. These connectors include an adapter into which each optical fiber is connected, which aligns each fiber along an optical axis. When utilized with a light-emitting element of a light-receiving element, the plugs are inserted into a receptacle in which the light emitting or light-receiving element is contained.

As shown in FIG. 1, U.S. Pat. No. 5,123,071 discloses an overconnector assembly for converting a pair of simplex optical fiber connectors 2 into a unitary structure that operates as a duplex connector. The overconnector assembly comprises a bipartite structure of complementary parts 1, 1'. Each part has a double compartment interior 16, 17. The interior of each compartment 16, 17 has a precisely shaped profile conforming to a shape of a defined exterior profile 21 of each simplex optical fiber connectors 2. However, each of the simplex optical fiber connectors 2 must have the defined exterior profile 21. Obviously, the overconnector assembly cannot convert a pair of simplex optical fiber connectors which lack the defined exterior profile. Furthermore, optical fiber connectors having other exterior profiles have to be changed to precisely fit the overconnector assembly, which requires extra work.

U.S. Pat. No. 5,398,295 discloses a two part clip for converting two simplex connector into a duplex connector. This design fastens together at two opposite ends, providing a fairly secure engagement of the connectors in the clip. In this design, the connectors cannot be disengaged from the clip without disassembling the clip halves from one another.

BRIEF DESCRIPTION OF THE INVENTION

An object of the present invention is to provide a duplex clip which converts a pair of simplex optical fiber connectors into a unitary structure that operates as a duplex connector.

Another object of the present invention is to provide a duplex connector comprising a duplex clip and a pair of optical fiber connectors slipped in and out of the clip without disassembling the clip halves.

A duplex clip in accordance with the present invention comprises a first complementary part and a second complementary part. The first complementary part and the second complementary part are identical to one another. The first complementary part includes a base, a side wall and a compartment wall, wherein the side wall is perpendicularly disposed at the edge of the base, and the compartment wall is mounted at the center of the base. The first complementary part can tightly engage with the second complementary part to stably clip the simplex optical fiber connectors together.

Other objects, advantages and novel features of the invention will become more apparent from the following detailed description when taken in conjunction with the accompanying drawings.

DETAILED DESCRIPTION OF THE INVENTION

Figure 1:
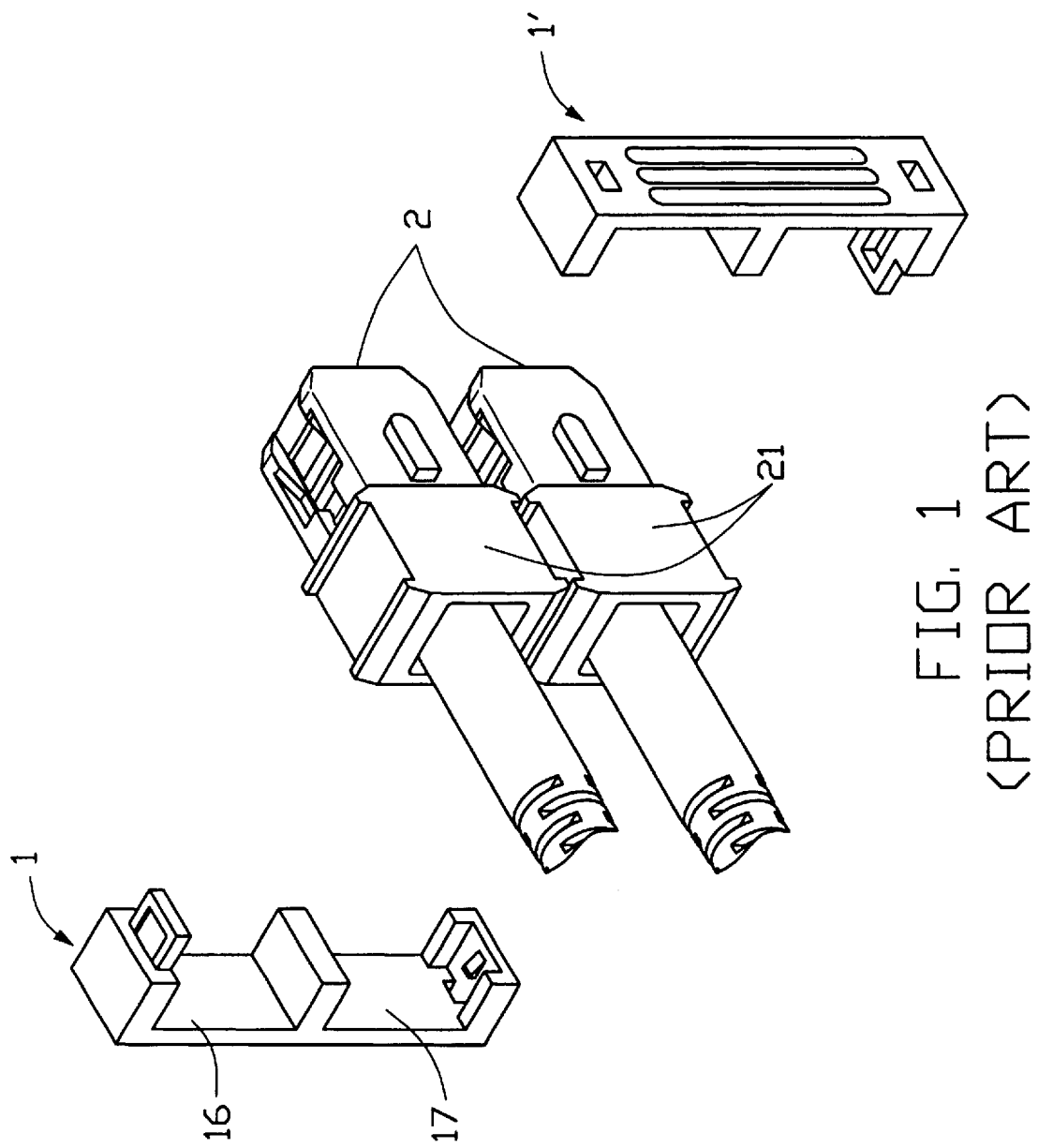
FIG. 1 is a perspective, exploded view of a prior art duplex clip with a pair of optical fiber connectors.
Figure 2:
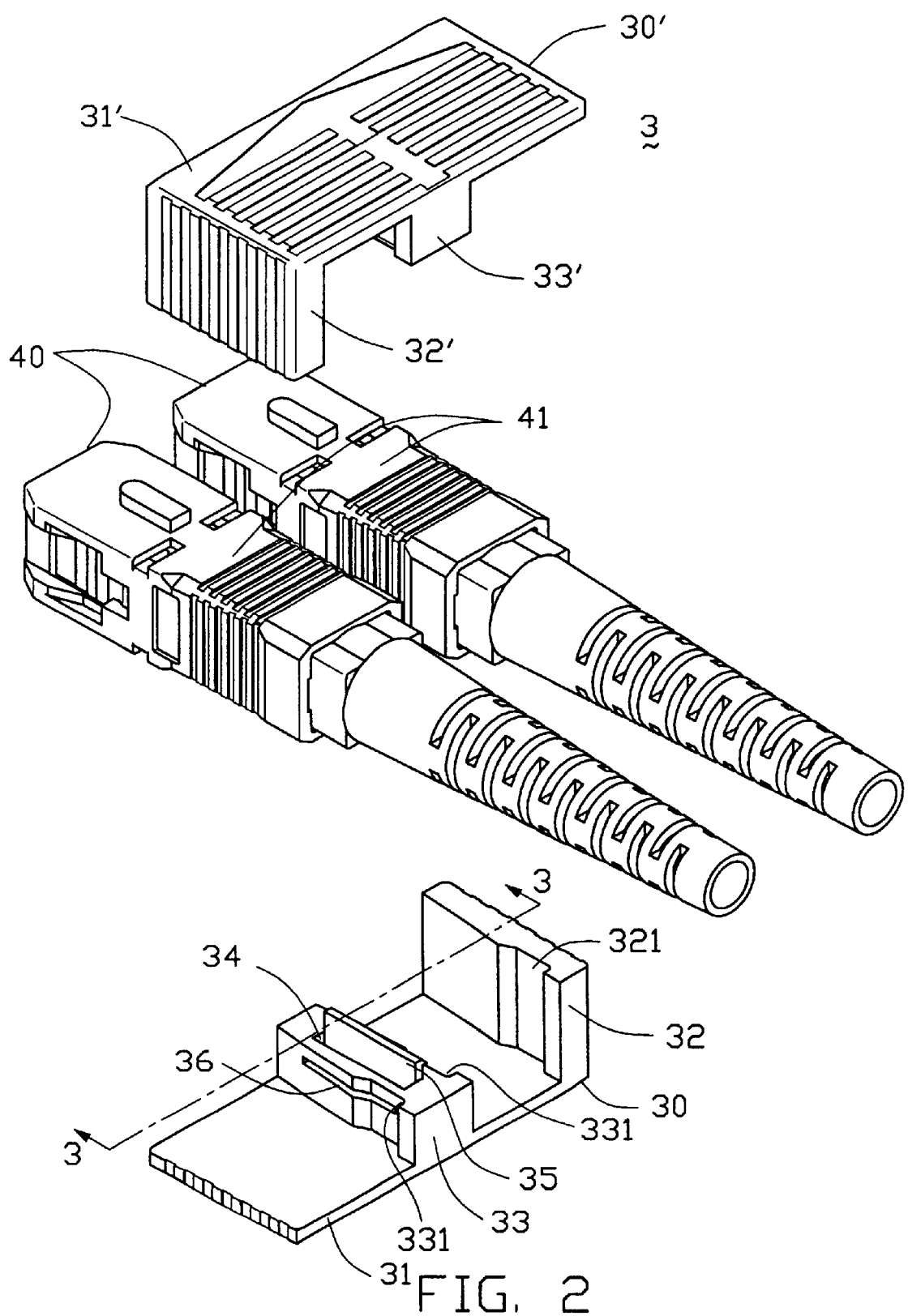
FIG. 2 is a perspective, exploded view of a duplex clip according to the present invention with a pair of connectors.

As shown in FIG. 2, a duplex clip 3 of the present invention comprises a first complementary part 30 and a second complementary part 30' for converting a pair of simplex optical fiber connectors 40 into a unitary structure that operates as a duplex optical fiber connector. Both the first complementary part 30 and the second complementary part 30' have an identical same structure.

The first complementary part 30 includes a base 31, a side wall 32 and a compartment wall 33, wherein the side wall 32 is perpendicularly disposed at the edge of the base 31, and the compartment wall 33 is mounted at the center of the base 31.

Figure 3:
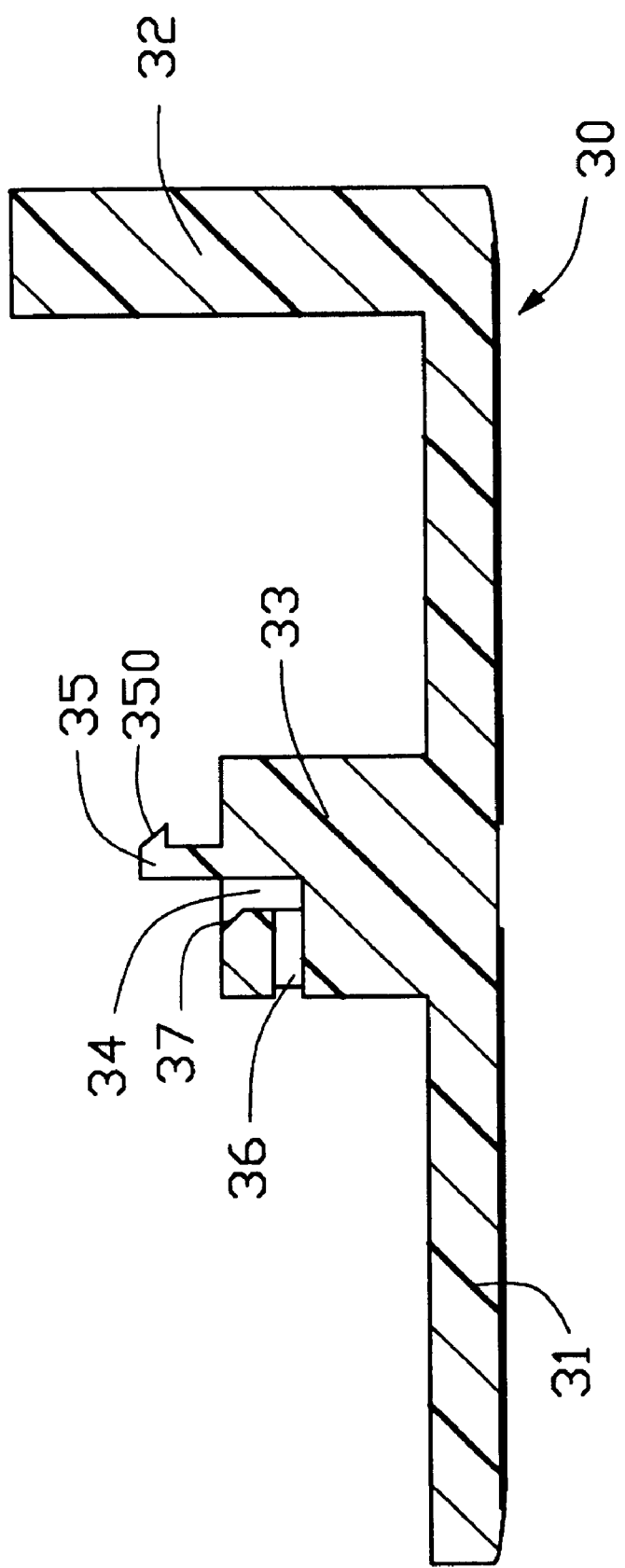
FIG. 3 is a cross-sectional view of a complementary part of FIG. 2 taken along line 3—3 in FIG. 2.
Figure 4:
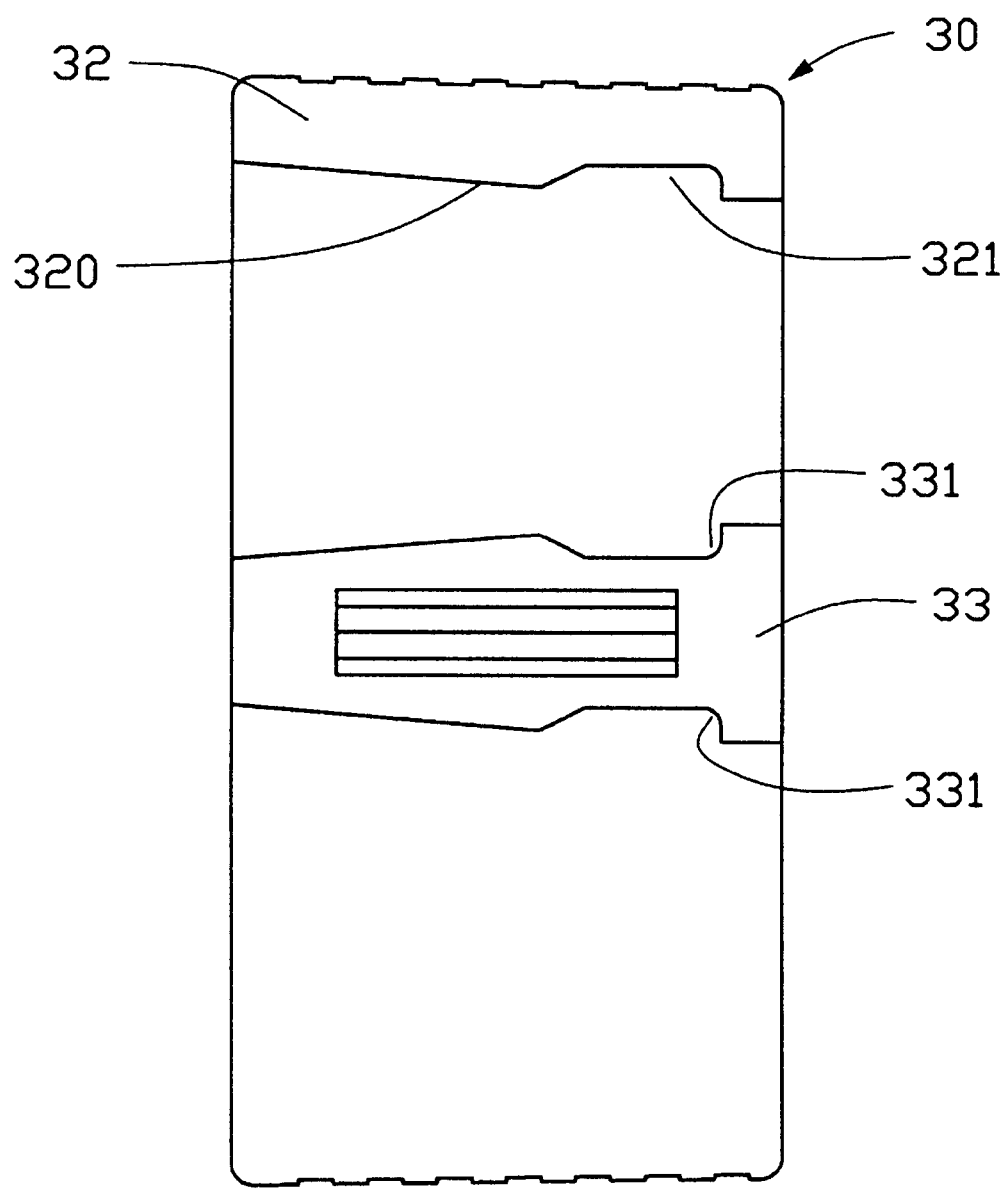
FIG. 4 is a top plan view of a complementary part of the duplex clip of FIG. 2.

Referring to FIGS. 2–4, The side wall 32 contains an interior surface 320 and a recess 321 defined on the interior surface 320. Both the interior surface 320 and the recess 321 are made compatible to a surface 41 of the optical fiber connector 40.

The compartment wall 33 comprises a first slot 34 and a second slot 36. The first slot 34 and the second slot 36 are perpendicular to and communicate with each other. A key 35 near the first slot 34 extends from the top of the compartment wall 33, and a first leading surface 350 is formed on a top corner of the key 35 to aid convenient engagement with a first slot (not shown) of the second complementary part 30'. A second leading surface 37 is formed at one side of the first slot 34 to aid convenient engagement with a key (not shown) of the second complementary part 30'. Additionally, a depth and a width of the first slot 34 are sized to accommodate the key's height and width, and the height of the compartment wall 33 is exactly half the height disregarding the key 35 of the side wall 32. When the key of the second complementary part 30' is engaged in to the first slot 34, the key 35 is engaged in the first slot of the second complementary part 30'.

The compartment wall 33 further defines a pair of recesses 331 on opposite sides of the compartment wall 33. One of the recesses 331 is used together with the recess 321 defined on the interior surface 320 of the side wall 32 to precisely engage with the surface 41 of the optical fiber connector 40. The other recess 331 is used together with a recess (not shown) defined on a side wall 32' of the second complementary part 30'.

Figure 5:
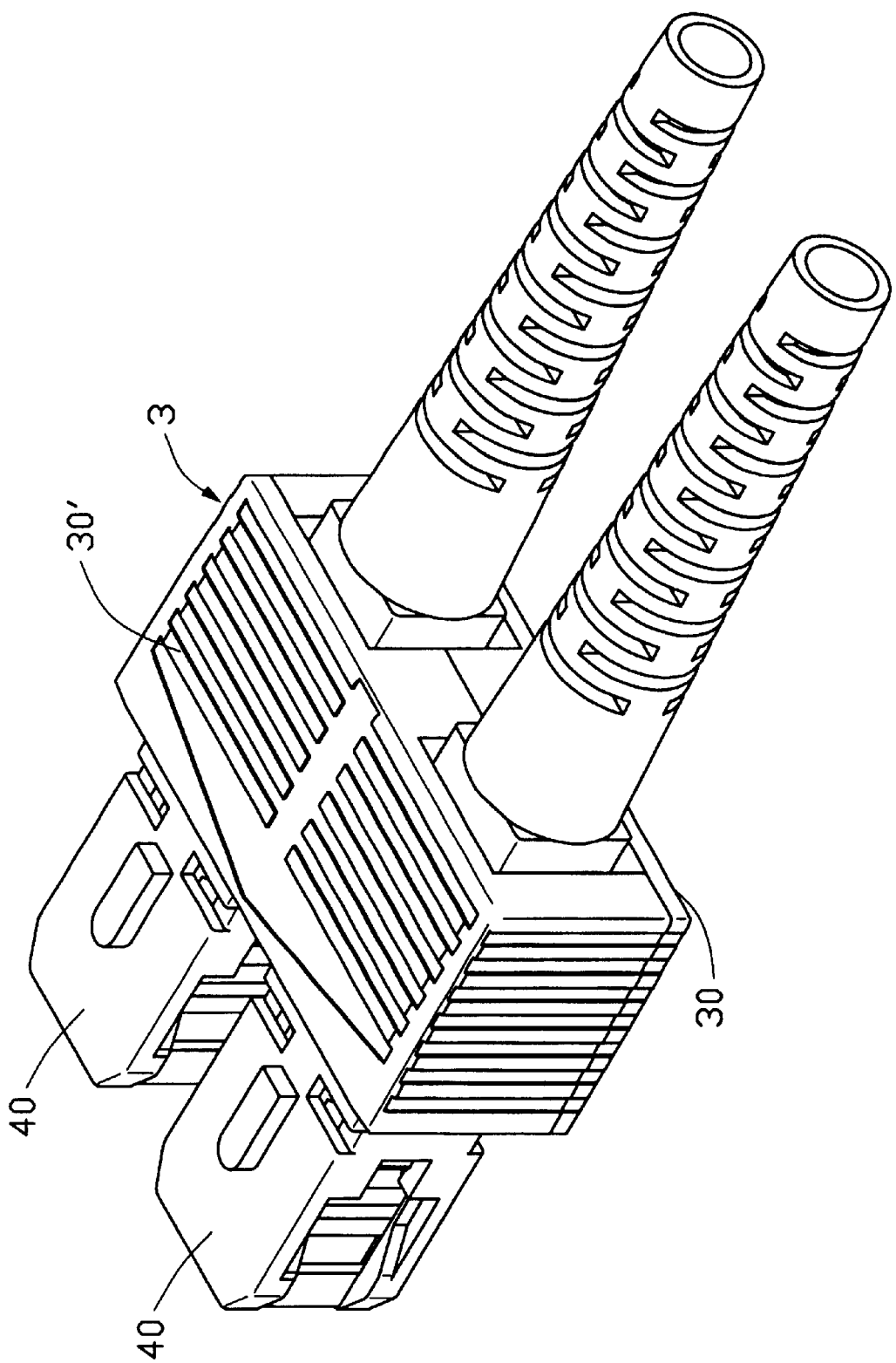
FIG. 5 is a perspective view, assembled view of FIG. 2.

In assembly, the pair of simplex optical fiber connectors 40 are inserted in the first complementary part 30 and the two complementary parts 30, 30' are coupled together. As shown in FIG. 5, the key 35 of the first complementary part 30 is inserted in the first slot of the second complementary part 30' and then is latched in a second slot (not shown) of the second complementary part 30'. The key of the second complementary part 30' is inserted in the first slot 34 of the first complementary part 30 and then is latched in the second slot 36 of the first complementary part 30.

In use, the pair of optical fiber connectors 40 is engaged in two identically shaped spaces which are divided by the compartment wall 33 of the first complementary part 30 and a compartment wall 33' of the second complementary part 30'. The side walls 32, 32' are resilient enough that, if desired, the simplex optical fiber connectors 40 can be pulled out of their spaces for insertion, without unclipping the first and second complementary parts 30, 30'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A duplex clip for converting a pair of simplex optical fiber connectors into a unitary structure that operates as a duplex optical fiber connector comprising:

a first complementary part having a base, a side wall and a compartment walls a key extending from the top of the compartment wall and having a leading surface on a top corner thereof; and a second complementary part having the same structure as the first complementary part;

wherein the side wall is perpendicularly disposed at the edge of the base, the compartment wall is mounted at the center of the base, and the first complementary part tightly engages with the second complementary part at the compartment walls by the key latched therein to stably clip the two optical fiber connectors between the first and second complementary parts.

2. The duplex clip as claimed in claim 1, wherein the compartment wall comprises a first slot and a second slot.

3. The duplex clip as claimed in claim 1, wherein the side walls are resilient enough to pull the optical fiber connectors out of their spaces for insertion without unclipping the first and second complementary parts.

4. The duplex clip as claimed in claim 1, wherein a recess is formed in the side wall, and a pair of recesses are formed in opposite sides of the compartment wall for compatibly mating with outside surfaces of the optical fiber connectors.

5. The duplex clip as claimed in claim 2, wherein a depth and a width of the first slot are sized to accommodate the key's height and width.

6. The duplex clip as claimed in claim 2, wherein a second leading surface is formed at one side of the first slot to aid convenient engagement with the key of the second complementary part.

7. A duplex clip assembly comprising:

a pair of simplex optical fiber connectors; and a duplex clip for converting the optical fiber connectors into a unitary structure that operates as a duplex optical fiber connector comprising:

a first complementary part having a base, a side wall and a compartment wall, a key extending from the compartment wall; and a second complementary part having the same structure as the first complementary part;

wherein the side wall is perpendicularly disposed at the edge of the base, the compartment wall is mounted at the center of the base, and the first complementary part tightly engages with the second complementary part at the compartment walls by the key latched therein to stably clip the two optical fiber connectors between the first and second complementary parts.

8. The duplex clip as claimed in claim 7, wherein the compartment wall comprises a first slot and a second slot.

9. The duplex clip as claimed in claim 7, wherein the key extends from the top of the compartment wall.

10. The duplex clip as claimed in claim 7, wherein a recess is formed in the side wall, and a pair of recesses are formed in opposite sides of the compartment wall for compatibly mating with outside surfaces of the optical fiber connectors.

11. The duplex clip as claimed in claim 8, wherein a depth and a width of the first slot are sized to accommodate the key's height and width.

12. The duplex clip as claimed in claim 7, wherein the key has a leading surface on a top corner thereof.

13. A duplex clip for retaining a pair of connectors, comprising:

a first complementary part defining a base, a side wall extending upwardly from one side edge of the base and a compartment wall extending upwardly from a center portion of the base, locking means formed on said compartment wall; and a second complementary part being identical to said first complementary part; wherein said first and second complementary parts are face to face fastened to each other by the corresponding locking means, with or without any connectors retained therein, under a condition that the side wall of said first complementary part is not locked with said second complementary part and the side wall of said second complementary part is not locked with said first complementary part, wherein the side walls are resilient enough to pull the connectors out of their spaces without unclipping the first and second complementary parts.

14. The duplex clip as claimed in claim 13, wherein the compartment wall comprises a first slot and a second slot for engagement with the corresponding locking means.

15. The duplex clip as claimed in claim 14, wherein a depth and a width of the first slot are sized to accommodate locking means.

16. The duplex clip as claimed in claim 14, the locking means is a key which extends from the top of the compartment wall.

17. The duplex clip as claimed in claim 16, wherein the key has a leading surface on a top corner thereof.

18. The duplex clip as claimed in claim 16, wherein the first and second slots communicate with each other, and the key can be latched in the second slot.

19. The duplex clip as claimed in claim 16, wherein a second leading surface is formed at one side of the first slot to aid convenient engagement with the corresponding key.

20. The duplex clip as claimed in claim 13, wherein each of said first complementary part and said second complementary part has only one side wall which is higher than the corresponding compartment wall thereof.

* * * * *